United States Patent
Nyght et al.

(10) Patent No.: US 9,236,660 B2
(45) Date of Patent: Jan. 12, 2016

(54) ELECTROMAGNETIC ATTENUATING OBJECT AND METHOD OF ELECTROMAGNETIC ATTENUATION

(71) Applicant: Raytheon Company, Waltham, MA (US)

(72) Inventors: Reed W Nyght, Tucson, AZ (US); Robert D Johnson, Tucson, AZ (US); Nathan L Evans, Vail, AZ (US)

(73) Assignee: Raytheon Company, Waltham, MA (US)

( * ) Notice: Subject to any disclaimer, the term of this patent is extended or adjusted under 35 U.S.C. 154(b) by 480 days.

(21) Appl. No.: 13/855,060

(22) Filed: Apr. 2, 2013

(65) Prior Publication Data

US 2014/0292553 A1 Oct. 2, 2014

(51) Int. Cl.
*H01Q 17/00* (2006.01)
*F41H 11/02* (2006.01)
*B29L 31/00* (2006.01)
*B29C 65/66* (2006.01)
*B29C 65/00* (2006.01)
*H01Q 1/28* (2006.01)

(52) U.S. Cl.
CPC ............... *H01Q 17/00* (2013.01); *F41H 11/02* (2013.01); *B29C 65/66* (2013.01); *B29C 66/532* (2013.01); *B29C 66/723* (2013.01); *B29C 66/7392* (2013.01); *B29C 66/73143* (2013.01); *B29C 66/73715* (2013.01); *B29C 66/74* (2013.01); *B29L 2031/777* (2013.01); *H01Q 1/28* (2013.01)

(58) Field of Classification Search
CPC .......... H01Q 17/00; H01Q 1/28; F41H 11/02; B29C 66/71; B29C 66/7392; B29C 66/73715; B29C 66/723; B29C 65/66; B29C 66/73143; B29C 66/532; B29L 2031/777
USPC .................................................. 342/1-4, 62
See application file for complete search history.

(56) References Cited

U.S. PATENT DOCUMENTS

| | | | | | |
|---|---|---|---|---|---|
| 3,616,140 | A | * | 10/1971 | Copeland | B29C 70/00 244/1 R |
| 5,316,820 | A | * | 5/1994 | Harpell | B32B 3/16 428/102 |
| 2005/0271881 | A1 | * | 12/2005 | Hong | B82Y 30/00 428/423.1 |
| 2011/0073710 | A1 | * | 3/2011 | Rawlings | B64C 21/10 244/130 |
| 2012/0034833 | A1 | * | 2/2012 | Schaube | B29C 70/086 442/172 |
| 2014/0292553 | A1 | * | 10/2014 | Nyght | H01Q 17/00 342/2 |

* cited by examiner

*Primary Examiner* — John B Sotomayor
(74) *Attorney, Agent, or Firm* — Renner, Otto, Boisselle & Sklar, LLP

(57) ABSTRACT

Electromagnetic attenuation of an object is accomplished by attaching a boot to a surface of an operational part of the object. The boot includes a thermoplastic material, such as in a thermoplastic layer, and an electromagnetic attenuation material, such as in an electromagnetic attenuation layer that overlies at least part of the thermoplastic layer. The attaching is accomplished by placing the boot onto the operational part, and then heat shrinking the boot to attach the boot to the operational part. The electromagnetic attenuation layer may have gaps in it prior to the heat shrinking, gaps that are closed during the heat shrinking, to the greater contraction of the thermoplastic layer. The boot and method may be used to advantageously provide electromagnetic attenuation without a need for spraying processes. The method may be used to retrofit and/or repair an object, without needed to remove it from the field.

20 Claims, 1 Drawing Sheet

ELECTROMAGNETIC ATTENUATING OBJECT AND METHOD OF ELECTROMAGNETIC ATTENUATION

BACKGROUND OF THE INVENTION

1. Technical Field of the Invention

The invention is in the field of electromagnetic attenuation.

2. Description of the Related Art

Electromagnetic attenuation coatings are often applied to objects, such as missiles or other air vehicles, to reduce their visibility to radar. Such coatings are generally applied by spraying. Spraying has the disadvantage of being costly and labor intensive. It also may require specialized equipment and environments, and use of potentially dangerous chemicals. It would be desirable to avoid these problems with current methods of applying electromagnetic attenuation coatings.

SUMMARY OF THE INVENTION

According to an aspect of the invention, a method of electromagnetic attenuation includes heat shrinking onto an object a boot that includes an electromagnetic attenuation layer.

According to another aspect of the invention, a boot for providing electromagnetic attenuation includes a thermoplastic layer, and an electromagnetic attenuation layer at least partially overlapping the thermoplastic layer.

According to yet another aspect of the invention, an electromagnetic-attenuating object includes: an operational part of the object; and a boot covering at least part of an exterior surface of the operational part. The boot includes: a thermoplastic material; and an electromagnetic attenuation material overlapping at least part of the thermoplastic material. The boot has a shape corresponding to a shape of at least part of the exterior surface of the operational part. The boot is attached to the at least part of the exterior surface at least in part by heat shrinking the thermoplastic material onto at least part of the exterior surface.

According to a further aspect of the invention, a method of providing electromagnetic attenuation to a surface of an irregularly-shaped part of an object includes the steps: placing a boot on the irregularly-shaped part, wherein the boot has a shape corresponding to a shape of at least part of the surface of the irregularly shaped object, and wherein the boot includes a thermoplastic material, and an electromagnetic attenuation material overlapping at least part of the thermoplastic material; and heating the boot, shrinking the material layer to thereby provide attachment of the boot to the part To the accomplishment of the foregoing and related ends, the invention comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF THE DRAWINGS

The annexed drawings, which are not necessarily to scale, show various features of the invention.

DETAILED DESCRIPTION

Electromagnetic attenuation of an object is accomplished by attaching a boot to a surface of an operational part of the object. The boot includes a thermoplastic material, such as in a thermoplastic layer, and an electromagnetic attenuation material, such as in an electromagnetic attenuation layer that overlies at least part of the thermoplastic layer. The attaching is accomplished by placing the boot onto the operational part, and then heat shrinking the boot to non-adhesively attach the boot to the operational part. The electromagnetic attenuation layer may have gaps in it prior to the heat shrinking, gaps that are closed during the heat shrinking, to the greater contraction of the thermoplastic layer. The boot and method may be used to advantageously provide electromagnetic attenuation without a need for spraying processes, which may involve particular environments and surface preparation techniques. The method may be used to retrofit and/or repair an object, without needed to remove it from the field.

Figure 1:
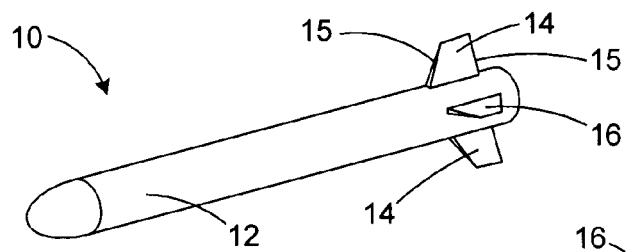
FIG. 1 is an oblique view of an electromagnetically-attenuating object, in accordance with an embodiment of the present invention.

FIG. 1 shows an electromagnetically-attenuating object 10 that includes operational parts 12 and 14. In the illustrated embodiment the object 10 is a missile, and the operational parts 12 and 14 include a fuselage 12, and a series of fins or flight control surfaces 14. The fins or flight control surfaces 14 may have edges 15, such as forward (and/or aft) edges. There are many other types of electromagnetically-attenuating objects that could have been shown instead. Being able attenuate electromagnetic signals is beneficial for a wide variety of air and space vehicles, such as a variety of airplanes, spacecraft, missiles, or other powered or unpowered flying vehicles. Electromagnetic-attenuating objects may also include water vehicles, either surface ships or underwater vehicles, such as submarines. Land vehicles of various sorts are also possible electromagnetically-attenuating objects. The various types of vehicles may be manned or unmanned. In addition, the electromagnetically-attenuating object may be a stationary object, such as a building.

The object 10 is able to attenuate incoming electromagnetic energy for at least some wavelengths. This attenuation may be accomplished in order to make the object less detectable, for example by hiding the object from detection from radar. The attenuation is accomplished using one or more boots 16 that cover all or part of the external surfaces of some or all of the operational parts 12 and 14. For example the boots 16 may include boots that are like sleeves in that they slide over the operational parts 14, covering edges 15 of the parts 14. The attenuation refers to attenuation of incoming electromagnetic energy for at least some wavelengths of energy, beyond what is provided in the absence of the boot(s) 16, for example by external surfaces of the operational parts 12 and 14.

The term "operational part" is used broadly herein to indicate all or a portion of the object other than the boot(s) 16. A part can be an "operational part" just by being a part of the underlying object 10, without needing to perform any specific function.

Figure 2:
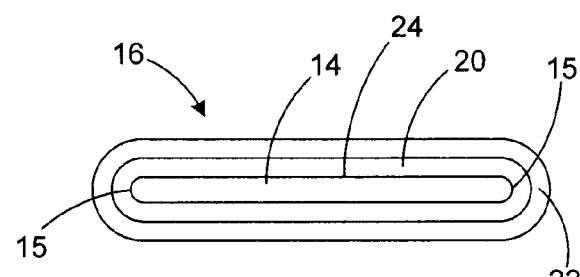
FIG. 2 is a cross-sectional view, not to scale, or part of the object of FIG. 1.

Turning now to FIG. 2, the boot 16 has a pair of overlapping layers, with a thermoplastic layer 20 overlapped at least in part by an electromagnetic attenuation layer 22. FIG. 2 is not to scale, but in it the thicknesses of the layers 20 and 22 have been exaggerated for illustration purposes. In the illustrated embodiment the boot 16 is configured with the thermoplastic layer 20 to be placed in contact with the external surface of one of the operational parts 14, between the operational part 14 and the attenuation layer 22. As described further below, at least part of the attachment between the boot 16 and the operational part 14 is provided by heat shrinking the thermoplastic material of the boot 16.

As an alternative configuration, the order of the layers in the boot 16 may be reversed, with the attenuation layer in contact with the external surface, between the operational part and the thermoplastic layer. As another alternative, the attenuation material and the thermoplastic materials may be interspersed in a single layer.

The boot 16 may also include an adhesive layer 24 that provides some adhesive attachment from the boot 16 to the operational part 14, supplementing the attachment by heat shrinking. The adhesive layer 24 may include a suitable pressure sensitive adhesive, which may also be used to aid in holding the boot 16 in place during the heat shrinking operation. Alternatively or in addition, the adhesive layer 24 may include a heat-activated adhesive that is activated by the heat shrinking. In an alternative configuration the adhesive layer 24 may be omitted entirely, if desired, with the boot 16 held in place fully by the heat shrinking.

The thermoplastic layer 20 may have a thickness of 0.38 mm (15 mils) or less, may have a thickness of 0.25 mm (10 mils) or less, and may have a thickness of 0.13 mm (5 mils) or less. Any of a variety of elastomeric thermoplastic materials, such as elastomeric thermoplastic polymers, would be suitable for use in the thermoplastic layer 20. Examples of suitable thermoplastic materials for the thermoplastic layer 20 are polyolefin, polyvinylchloride, polyvinylidene fluoride, polytetrafluoroethylene (TEFLON), and fluoroethylene propylene.

The electromagnetic attenuation layer 22 may include a dielectric material base material such as a suitable polymer, with a fill material providing electromagnetic attenuation. The base material may be a resin, with examples of suitable materials including polyurethane, silicone, fluorosilicones, fluorocarbons, and neoprene rubbers. The fill material may be a dielectric and/or magnetic fill material. The fill materials may include fibers or particles. Suitable dielectric fill materials may include glass, fused silicon, carbon (e.g., graphite), silicon carbide, or carbon nanotubes. Suitable magnetic fillers may include carbonyl iron powder, iron silicide powder, Sendust powder, ferrite powder, nickel alloy powder, or iron alloy powders (such as iron/cobalt/aluminum powders. The electromagnetic attenuation layer 22 may a thickness of from 0.51 mm (20 mils) to 1.78 mm (70 mils), to give an example thickness range. The fill material may be uniformly distributed within the electromagnetic attenuation layer 22, or alternatively may be non-uniformly distributed within the electromagnetic attenuation layer 22.

The boot 16 may be formed to achieve a suitable shape, for example by molding. Preferably the boot 16 has a shape that corresponds to that of the surface of the operational part 12 or 14 (FIG. 1) that it is to be attached to. At least some of the operational parts 12 and 14, or some portions of the operational parts 12 and 14, may have irregular shapes. The term "irregular shape," as used herein, is defined as a shape that has a varying curvature along its surface. A cylinder would not qualify as having an irregular shape, since it has a constant curvature. Nor would a flat surface qualify as an irregular shape. But the external shape of the fins 14 at least, is an irregular shape, because of variations in curvature. Even portions of the fuselage 12 are surfaces with irregular shape, at least because the fuselage 12 narrows toward its nose. The boot 16 may have an irregular shape corresponding to an irregular shape on all or part of a surface of one or more of the operational parts 12 and 14.

The heat to perform the heat shrinking may be provided by hot air directed at the boot 16. The hot air may be provided by a suitable tool, such as a suitable hot air gun.

The layers 20 and 22 may have different materials, and thus different properties. In particular, the layers 20 and 22 may contract by different amounts and/or at different rates, when the boot 16 is heated. Specifically the thermoplastic layer 20 may contract during heating to a greater degree than the electromagnetic attenuation layer 22. This difference in contraction may produce stresses between the layers 20 and 22, which could lead to wrinkling or other problems.

Figure 3:
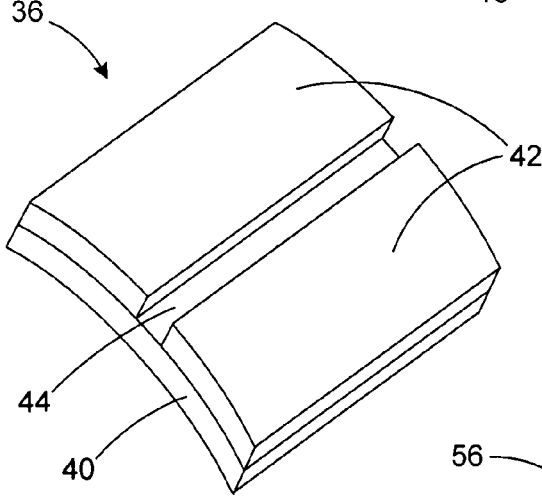
FIG. 3 is an oblique view of one embodiment of a boot for providing electromagnetic attenuation, in accordance with the present invention.

To avoid these potential problems, the electromagnetic attenuation layer 22 may have gaps in parts. FIG. 3 shows an embodiment where a boot 36 has an electromagnetic attenuation layer 42 with a gap 44 in it, exposing a portion of the underlying thermoplastic layer 40. The gap 44 is from one edge 46 of the boot 36 to an opposite edge 48 of the boot 36. The gap 44 as shown has a substantially uniform width over its length, but alternatively the gap 44 may have a varying width.

Figure 4:
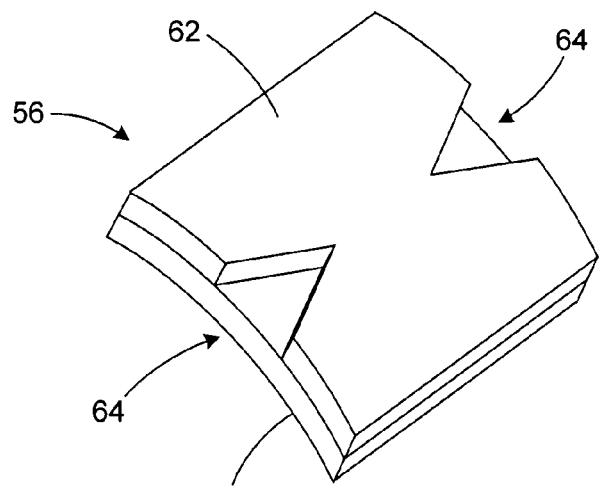
FIG. 4 is an oblique view of another embodiment of a boot for providing electromagnetic attenuation, in accordance with the present invention.
Figure 5:
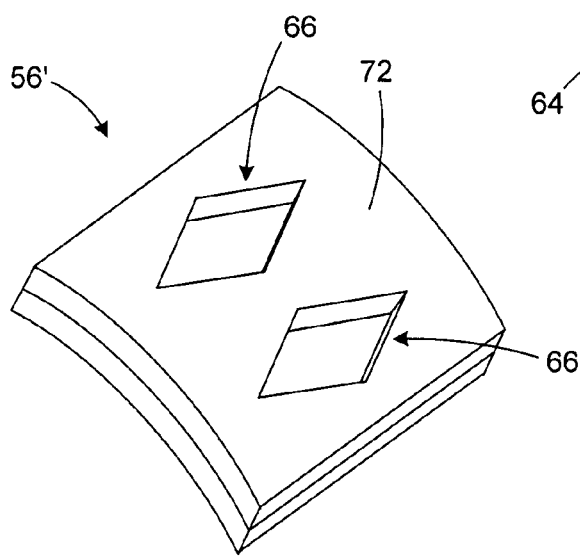
FIG. 5 is an oblique view of yet another embodiment of a boot for providing electromagnetic attenuation, in accordance with the present invention.

FIG. 4 shows another embodiment with a different type of gap, with a boot 56 having an electromagnetic attenuation layer 62 having darts 64 therein. The term "dart" is used herein to refer to a gap which has at least one closed end, in other words where the gap does not extend from one edge to an opposite edge. The darts 64 may have varying thickness, as is illustrated in the embodiment in FIG. 4. The darts 64 in the illustrated embodiment have triangular shapes, exposing triangular portions of the underlying thermoplastic layer 60. FIG. 5 shows an alternative boot 56' that has darts 66 in an electromagnetic attenuation layer 72, with the darts 66 having both ends closed.

The gaps 44, 64, and 66 may be used to compensate for the differences in the shrinkage of the multiple boot layers when heated. The gaps 44, 64, and 66 may be configured such that the gaps 44, 64, and 66 are closed up during the heat shrinking process, with the result that the installed boot has its electromagnetic layer overlapping substantially all of the underlying thermoplastic layer. The configuration of the gaps 44, 64, and 66 may include their size, shape, location, and/or spacing, which may be selected taking into account the material characteristics of the layers, and the shape of the boot and the part onto which the boot is to be installed, to give examples.

Figure 6:
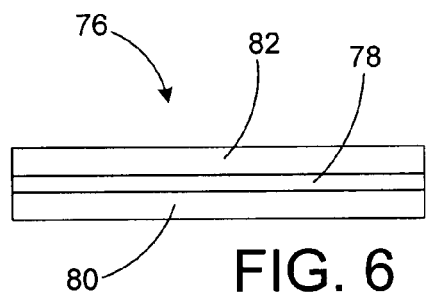
FIG. 6 is an end view of still another embodiment of a boot for providing electromagnetic attenuation, in accordance with the present invention.

FIG. 6 shows another alternative, a boot 76 that includes a conductive layer 78 in addition to a thermoplastic layer 80 and an electromagnetic attenuation layer 82. The boot 76 may be used on a part with a non-electrically-conductive surface, for example a part made out of, or having a surface made out of, a plastic or a composite material. For attenuating specular energy that impinges on an edge of a part, it is desirable to have cancellation of the incoming energy, such as by quarter-wavelength cancellation. Having an electrical ground plane is important for creating a controlled reflection of energy back through the electromagnetic attenuation layer 82, to accomplish this cancelation. In the boot 76 the conductive layer 78 serves this purpose.

The conductive layer 78 may be between the thermoplastic layer 80 and the electromagnetic attenuation layer 82, as it is in the embodiment illustrated in FIG. 6. Alternatively the conductive layer 78 may be on the opposite side of the thermoplastic layer 80. The conductive layer 78 may be a metal layer formed on the thermoplastic layer 80. For example the layers 78 and 80 together may be a metalized polyester film, such as a metalized MYLAR film. The conductive layer 78 may have a thickness of about 0.05 mm (2 mils), as a non-limiting example.

Features of multiple embodiments described above may be combined in a single device. For example a boot may have various types of the darts or other gaps described above. And a device may have both gaps and a conductive layer.

The various boots described above provide advantages over spraying techniques for depositing electromagnetic attenuation materials, in avoiding the need for surface preparation for spraying, or for the controlled environments that may be required for spraying. The boots are thus especially useful for repairs or retrofits in the field, where surface preparation may be difficult to perform, and controlled environments for spraying are hard to come by. The benefits may include reduced labor cost (avoiding surface preparation operations, re-work of thickness of sprayed layers), reduction of specialized tooling such as paint booths and ovens, and/or removal of wet-processes and use of potentially hazardous chemicals (e.g., methylethyl ketone) used in the manufacture and application of many sprayed coatings The boots also allow for rapid application of electromagnetic attenuation material, without a need to wait for curing of sprayed applications, for example. The boots may produce greater consistent repeatability in application of electromagnetic attenuation material.

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. An electromagnetic-attenuating object comprising:
an operational part of the object; and
a boot covering at least part of an exterior surface of the operational part;
wherein the boot includes:
a thermoplastic material; and
an electromagnetic attenuation material overlapping at least part of the thermoplastic material;
wherein the boot has a shape corresponding to a shape of the at least part of the exterior surface of the operational part; and
wherein the boot is attached to the at least part of the exterior surface at least in part by heat shrinking the thermoplastic material onto the at least part of the exterior surface.

2. The object of claim 1,
wherein the part is an irregularly-shaped part; and
wherein the boot has an irregular shape corresponding to the at least part of the exterior surface.

3. The object of claim 1,
wherein the thermoplastic material is in a thermoplastic layer; and
wherein the electromagnetic attenuation material is in an electromagnetic layer that at least in part overlaps the thermoplastic layer.

4. The object of claim 3, wherein the electromagnetic attenuation layer includes a polymer base material, and a fill material within the base material.

5. The object of claim 3, wherein the boot further includes an electrically-conductive layer in contact with the thermoplastic layer.

6. The object of claim 5, wherein the electrically-conductive layer is between the thermoplastic layer and the electromagnetic attenuation layer.

7. The object of claim 5, wherein the electrically-conductive layer is a metallic film deposited on the thermoplastic layer.

8. The object of claim 5, wherein the exterior surface of the operational part is made of an electrically-nonconductive material.

9. The object of claim 8,
wherein the exterior surface includes and edge; and
wherein the electrically-conductive layer covers at least part of the edge.

10. The object of claim 2, wherein the electromagnetic attenuation layer has one or more closed gaps therein that have been closed during the heat shrinking process.

11. The object of claim 10, wherein the closed gaps include closed darts in the electromagnetic attenuation layer.

12. The object of claim 1, wherein the thermoplastic material and the electromagnetic attenuation material are interspersed within a single layer.

13. The object of claim 1, wherein the boot further includes an adhesive that adheres the boot and the at least part of the exterior surface, providing part of the attachment between the boot and the at least part of the exterior surface.

14. The object of claim 13, wherein the adhesive is a pressure sensitive adhesive.

15. The object of claim 1,
wherein the object is an air vehicle; and
wherein the operational part is a fin or control surface of the air vehicle.

16. A method of providing electromagnetic attenuation to a surface of an irregularly-shaped part of an object, the method comprising:
placing a boot on the irregularly-shaped part, wherein the boot has a shape corresponding to a shape of at least part of the surface of the irregularly shaped object, and wherein the boot includes a thermoplastic material, and an electromagnetic attenuation material overlapping at least part of the thermoplastic material; and
heating the boot, shrinking the thermoplastic material to thereby provide attachment of the boot to the part.

17. The method of claim 16,
wherein the thermoplastic material is in a thermoplastic layer;
wherein the electromagnetic attenuation material is in an electromagnetic layer that at least in part overlaps the thermoplastic layer;
wherein the boot, prior to the heating, has one or more gaps in the electromagnetic attenuation layer, with the thermoplastic layer uncovered in the gap; and
wherein the heating closes the one or more gaps in the electromagnetic attenuation layer.

18. The method of claim 17, wherein the one or more gaps include one or more darts that have at least one closed end.

19. The method of claim 16,
wherein the part has an edge; and
wherein the placing includes covering the edge with the boot.

20. The method of claim 19,
wherein the object is a fin or flight control surface of an aircraft; and
wherein the placing includes covering the edge of the fin or flight control surface with the boot.

\* \* \* \* \*